Aug. 10, 1948.                L. H. HOSBEIN ET AL                2,446,766
                    FURNACE ARCH OR ROOF CONSTRUCTION

Filed Sept. 16, 1942                                     5 Sheets-Sheet 1

INVENTORS.
Louis H. Hosbein
Louis Ellman
BY George H. Von Gehr
Atty.

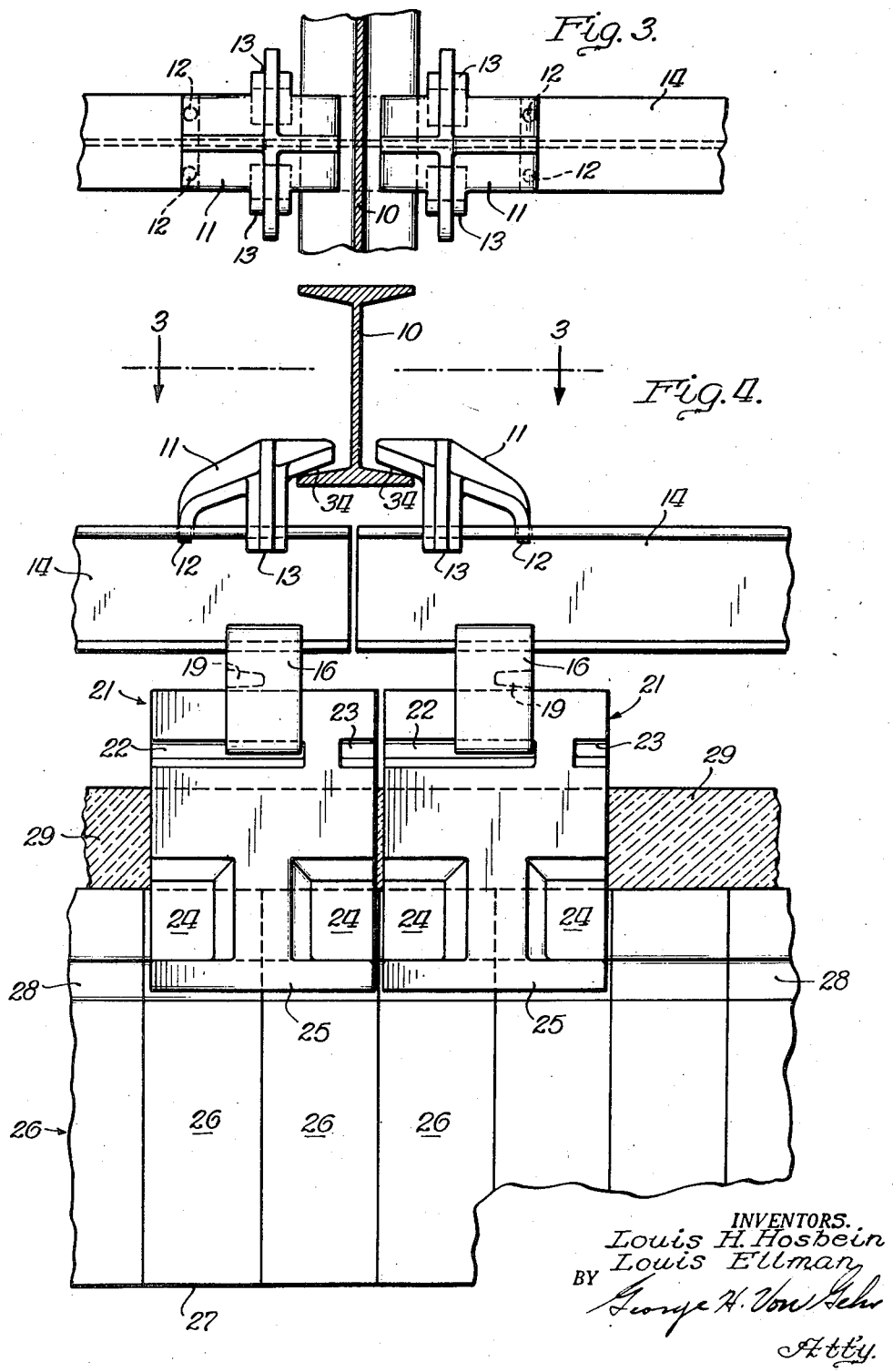

Aug. 10, 1948. L. H. HOSBEIN ET AL 2,446,766
FURNACE ARCH OR ROOF CONSTRUCTION
Filed Sept. 16, 1942 5 Sheets-Sheet 3

INVENTORS.
Louis H. Hosbein
Louis Ellman
BY George H. Von Gehr
Atty.

Aug. 10, 1948.   L. H. HOSBEIN ET AL   2,446,766
FURNACE ARCH OR ROOF CONSTRUCTION
Filed Sept. 16, 1942   5 Sheets-Sheet 4

INVENTORS.
Louis H. Hosbein
Louis Ellman
BY George H. Von Gehr
Atty.

Aug. 10, 1948.	L. H. HOSBEIN ET AL	2,446,766
FURNACE ARCH OR ROOF CONSTRUCTION
Filed Sept. 16, 1942	5 Sheets-Sheet 5
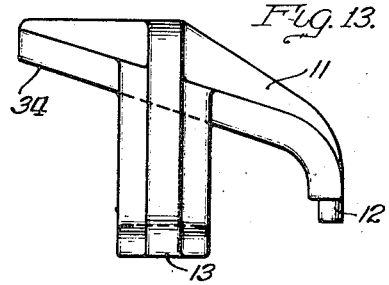
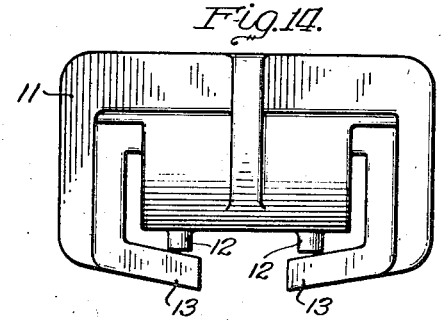
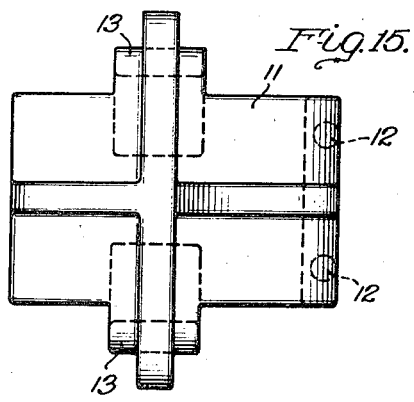
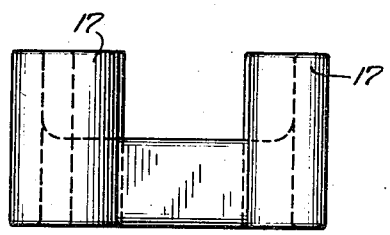
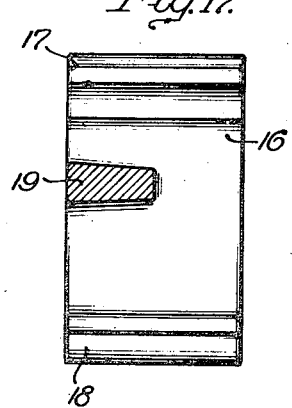
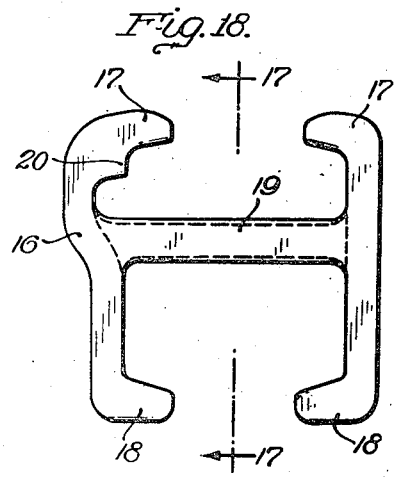
INVENTORS.
Louis H. Hosbein
Louis Ellman
BY George H. Von Gehr
Atty.

Patented Aug. 10, 1948

2,446,766

UNITED STATES PATENT OFFICE 2,446,766

FURNACE ARCH OR ROOF CONSTRUCTION

Louis H. Hosbein, Glencoe, Ill., and Louis Ellman, Pittsburgh, Pa., assignors to M. H. Detrick Company, Chicago, Ill., a corporation of Delaware Application September 16, 1942, Serial No. 458,592

14 Claims. (Cl. 110—99)

1

This invention relates in general to furnace arch or roof constructions.

The invention relates particularly to furnace arch or roof constructions in which the refractory members or tile exposed to the high furnace temperatures are supported from refractory hanger members which, in turn, are supported by or suspended from the main metal supporting structure. Thus, in the construction of the present invention the metal members are positioned more remote from the high temperature of the furnace than in constructions in which the main refractory members or tile are supported directly by metal members. As the refractory hanger members are able to withstand higher temperatures than the metal members previously used for this purpose, the construction of the present invention enables furnaces to be operated at higher temperatures than heretofore, or if operated at the usual temperatures, the construction of the present invention enables the furnaces to be operated for much longer periods without requiring repair and replacement.

Therefore, a principal object of the invention is the provision of a suspension arch or roof employing relatively narrow, small refractory members or tile sections as hangers between the main refractory members or tile exposed to the high temperature of the furnace and the metal supporting structure, for the purpose of increasing the normal period of operation of the furnace and/or increasing the maximum temperature permissible in the furnace without adversely affecting the more remotely located metal supporting structure.

A further important object of the invention is to decrease the quantity of metal required in the supporting structure of the furnace wall of a high temperature furnace.

A further object is to reduce the cost of the furnace arch or roof construction by replacing the previously used metal supporting structure in part by less costly refractory hanger members or tile.

Another object of the invention is the provision of relatively narrow, small refractory hanger members which can be easily installed and can be easily replaced individually without disturbing any substantial portion of the furnace wall or the metal supporting structure.

Another object of the invention is the provision of a suspension arch or roof for high temperature furnaces which has extremely low heat transfer characteristics.

A further more specific object of the invention

2 is the provision of a furnace arch or roof construction permitting relatively complete insulation and also permitting effective control of the degree or thickness of insulation employed.

A further object of the invention is the provision of a suspension arch or roof which is easy to install and easy to repair with a minimum of labor.

Other objects and advantages of the invention will be apparent from the following detailed description, taken in conjunction with the accompanying drawings, which disclose a preferred embodiment of the invention.

In the accompanying drawings:

Figure 3 is a horizontal section taken along line 3—3 of Figure 4.

Figure 4 is a transverse vertical section of the improved furnace arch or roof construction of the present invention.

Figures 13, 14 and 15 are views showing details of the clip member of the present invention.

Figures 16, 17 and 18 are views showing details of the metal hanger member of the present invention.

Figure 1:
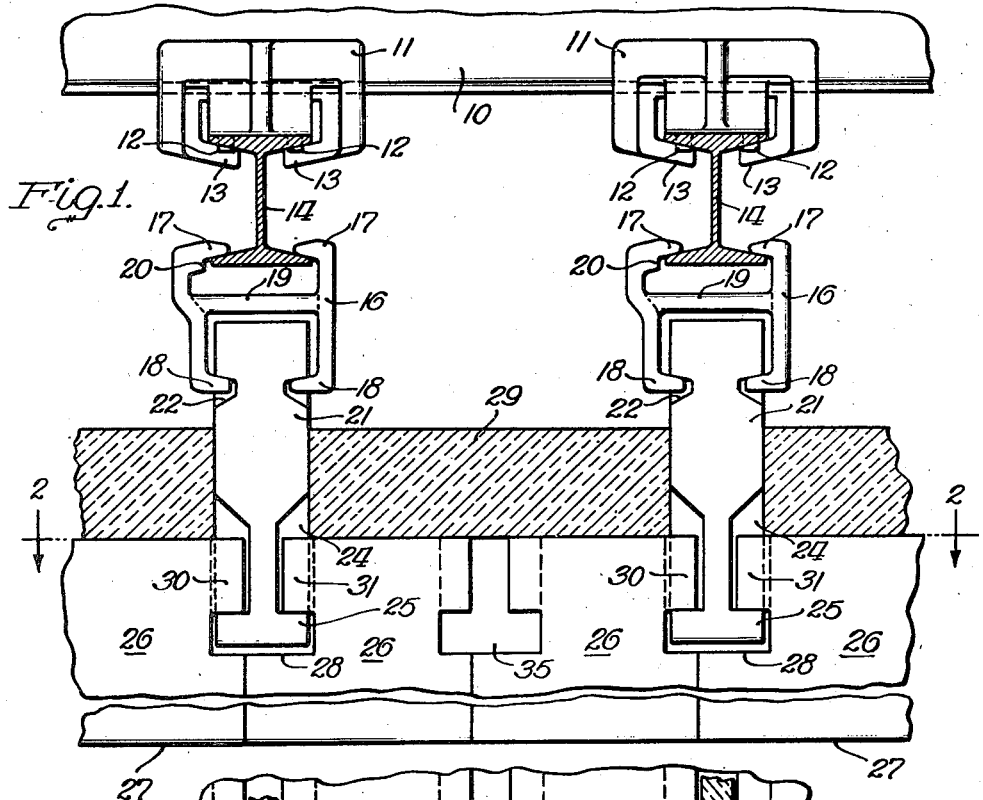
Figure 1 is a vertical section showing the improved furnace arch or roof construction of the present invention.

Referring to Figures 1 to 4 inclusive, the embodiment of the invention disclosed therein is in respect of a furnace arch which is suspended from a series of I beams 10 which may rest upon the brick work forming the sides of the furnace, or may be supported in any other desired manner. Pairs of clip members or clamps 11 are provided for supporting cross beams 14 from the I beams 10 at predetermined desired locations.

Each clip 11 has an upper projecting edge 34 adapted to be positioned in engagement with the lower flange of the I beam 10. Each clip 11 has lower inturned flanges 13 adapted to contact the upper flange of a cross beam 14. Each clip also has projections or lugs 12 at the lower outer portion thereof adapted to fit into holes drilled in the cross beam 14.

With the use of the clip 11 of the present invention, the size of the flange of the I beam 10 and the spacing between I beams 10 is relatively immaterial, since the holes in the beam 14, adapted to receive the projections or lugs 12 on the clip 11, can be drilled on the job to suit the particular size of the lower flange of the I beam 10 and the spacing thereof. This, of course, greatly simplifies the work involved in supporting the cross beams 14 from the main I beams 10 and also makes it unnecessary to have different sizes of clip castings for relatively moderate variations in the sizes of I beams 10 employed. It will be understood of course that when the projections or lugs 12 of the clips 11 are seated in the holes of the cross beams 14, the cross beams 14 will be securely suspended from the main I beams 10.

Metal hanger members 16 are provided for the purpose of supporting the refractory hanger members or tile 21 from the cross beams 14. Each metal hanger member 16 has upper inturned flanges 17 adapted to seat upon the lower flange of the cross beam 14. One of the pairs of flanges 17 on each metal hanger member 16 has a stepped construction 20 to enable the hanger member to be easily applied over the lower flange of the beam 14 by tilting the member 16 relative to the flange of the cross beam so that first one flange 17 and then the opposite flange 17 will be moved past the lower flange of the cross beam 14. The member 16 is then moved to its operative vertical position and both flanges 17 are brought into seating engagement with the lower flange of the cross beam 14. Each metal hanger member 16 has a metal wall intermediate the two ends thereof for connecting the two sides of the metal hanger member. The lower edges of the side walls of the metal hanger member have inturned flanges 18 which are adapted to cooperate with grooves in the refractory hanger member or tile 21 for supporting the tile from the metal hanger member.

Each refractory hanger member or tile 21 comprises a block having grooves 22 and 23 extending along the side walls thereof adjacent the upper edge of the tile 21. The lower inturned flanges 18 of the metal hanger member 16 are adapted to be received in either groove 22 or 23 to support the tile therefrom. In Figure 4 of the drawings the metal hanger member 16 is shown supporting the tile 21 by means of the inturned flanges 18 cooperating with the grooves 22 on the two side faces of the tile 21.

The lower portion of the tile 21 has recesses 24 in both side faces thereof for the purpose of supporting the main refractory members or tile 26 therefrom. Each main refractory member or tile 26 has grooves 28 along the side faces thereof with overlapping flanges 30 and 31 which are adapted to cooperate with the recesses 24 in the tile 21 and thus suspend the main tile members 26 from the hanger tile members 21.

The lower faces 27 of the main refractory members or tile 26 are exposed to the high temperatures within the furnace.

Insulation 29 is provided over the top surfaces of the main refractory members or tile 26, and inasmuch as the hanger tiles 21 are relatively narrow and small the insulation 29 covers substantially the entire upper surfaces of the main refractory members or tile 26.

Figure 2:
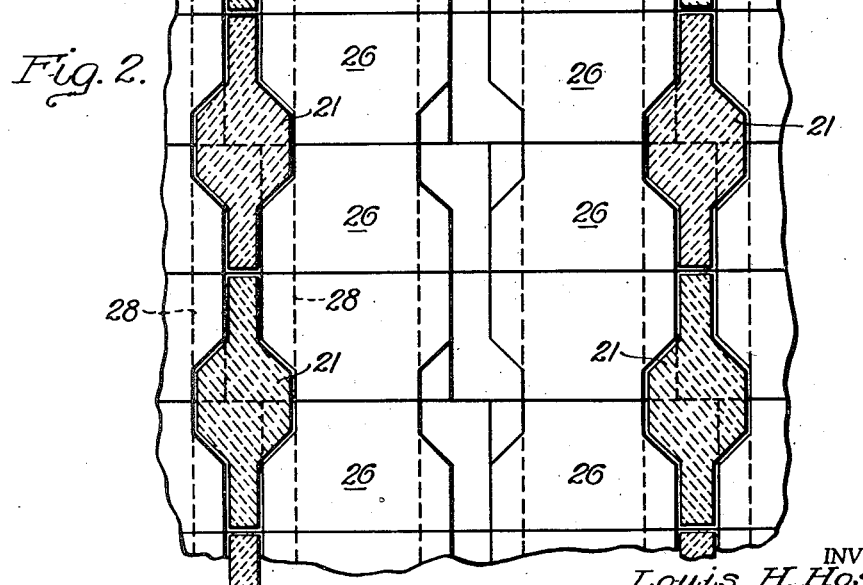
Figure 2 is a horizontal section taken along line 2—2 of Figure 1.
Figure 5:
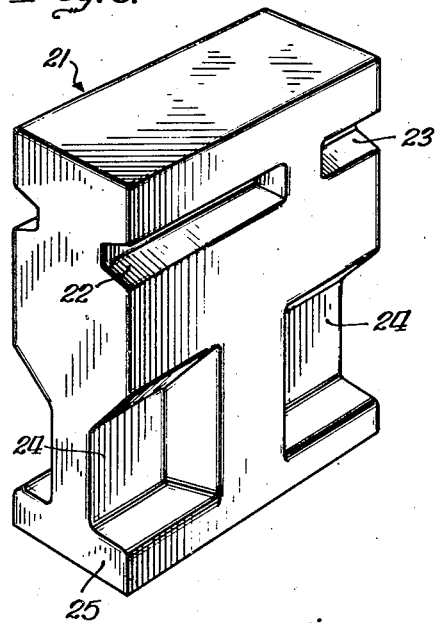
Figure 5 is a perspective view of the refractory hanger member or tile of the present invention.
Figure 8:
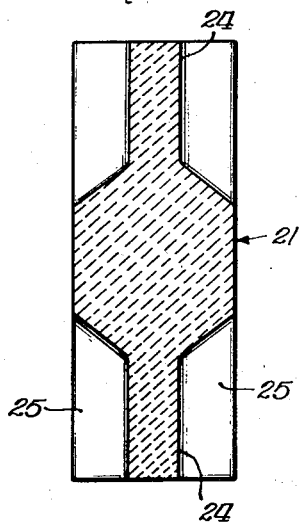
Figure 8 is a horizontal section taken along line 8—8 of Figure 7.
Figure 6:
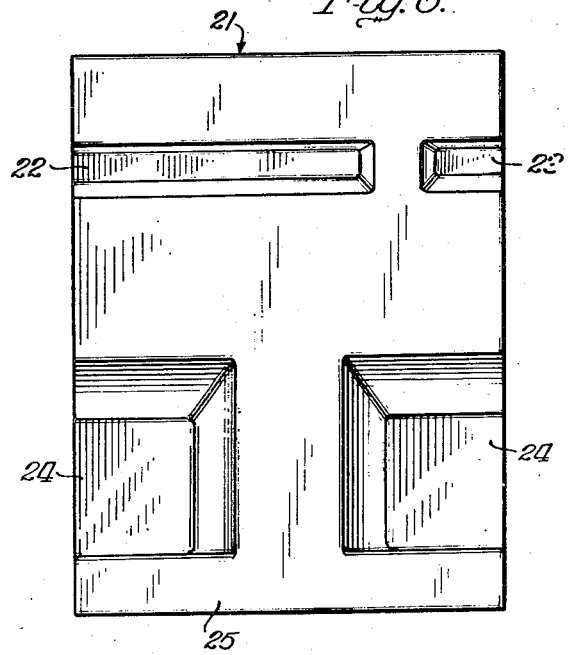
Figure 6 is a side view of the refractory hanger member.
Figure 7:
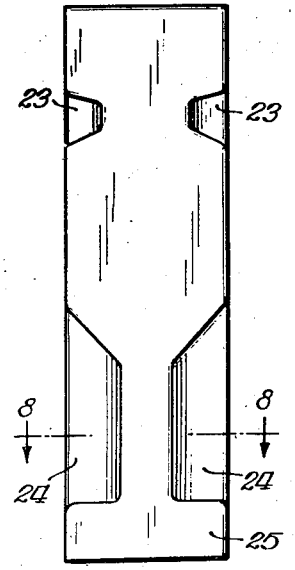
Figure 7 is an end view of the refractory hanger member.
Figure 9:
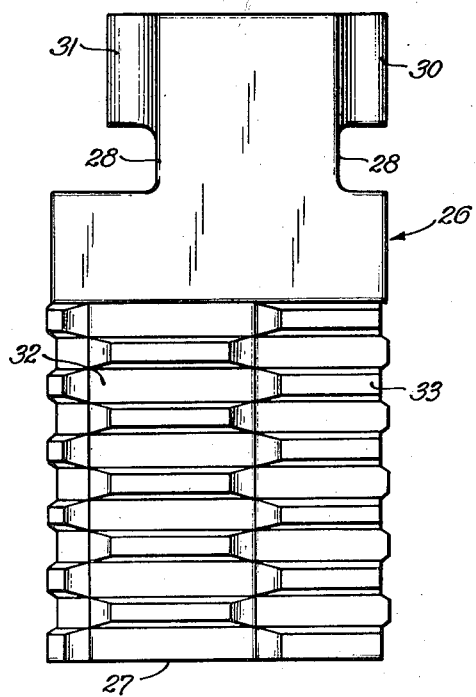
Figure 9 is a side view of the main refractory member or tile of the present invention.
Figure 10:
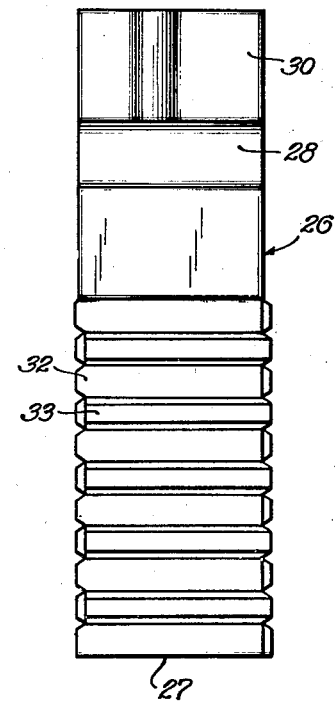
Figure 10 is an end view of the main refractory member.
Figure 11:
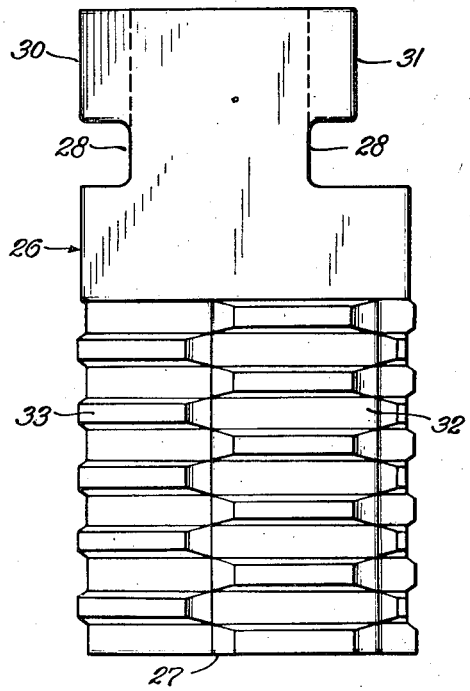
Figure 11 is a side view of the side of the main refractory member opposite to the side shown in Figure 9.
Figure 12:
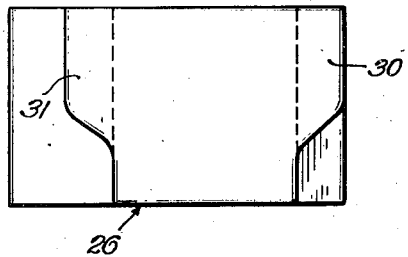
Figure 12 is a top view of the main refractory member as shown in Figure 9.

The main refractory members or tile 26 are provided with a series of groove and tongue means 32, 33 (Figures 9 to 11) around the four sides thereof, arranged to cooperate with corresponding groove and tongue means on adjacent main tile members 26 for heat sealing purposes. Also the adjacent rows of main tile members 26 suspended from the same hanger tile 21 are staggered with respect to each other, as shown in Figure 2, to further provide heat sealing means.

As shown in Figure 1, in the preferred embodiment of the invention, the refractory hanger members 21 are provided only in every second row of main hanger members 26 for supporting the same. This leaves the cavity 35 in alternate rows of assembled main refractory members 26, and such cavities 35 can, if desired, be filled with any suitable material to avoid heat losses.

As shown in Figures 5 to 8 inclusive, the hanger tile 21 has four recesses 24 of equal size, two on each side wall thereof, and accordingly four main refractory members 26 are adapted to be suspended from a single hanger tile 21. The tile 21 shown in Figures 5 to 8 inclusive is of comparatively small dimensions, in the preferred construction the dimensions being 7½ inches high, 5⅞ inches wide and 2$\frac{3}{8}$ inches thick. Also the grooved or recessed portions, that is, the grooves 22 and 23 and the recesses 24, are of a rather simple nature, each opening into the ends of the block so that these can be easily formed on the hanger tile 21 with the minimum of expense. As a result, the relatively narrow and small hanger tile 21 of the present invention is very inexpensive, costing only a few cents, and is adapted to take the place of a substantial portion of the metal supporting structure (involving the use of chrome alloy castings) of the usual furnace arch construction costing much more than the tile construction of the present invention.

As will be seen from Figures 5 to 8 inclusive, the recesses 24 in the lower portion of the hanger tile 21 correspond in size on both sides of the tile so that the tile can be reversed and will be equally operative in either position. The groove 23 in both sides of the tile 21 is shorter than the groove 22. The inner end of the longer groove 22 is positioned so that when the metal hanger member 16 is placed with the lower inturned flanges 18 in the groove 22 and abutting the inner end of this groove, the tile 21 will be centrally suspended from the metal hanger member 16, as shown in Figure 4. The length of the shorter groove 23 is approximately one-half the width of a metal hanger member 16 so that, if desired, instead of supporting the tile from a centrally positioned metal member 16 in the groove 22, the tile could be supported by a pair of metal hanger members 16 at each end thereof, in the grooves 22 and 23. With the inturned flanges 18 in the groove 23, the hanger member 16 would extend only half way into this groove and the remainder of the metal hanger member 16 would be available for supporting the hanger tile next adjacent. In this way each metal hanger member 16 is adapted to cooperate with the grooves 22, 23 of a pair of adjacent hanger tile 21 and such construction would therefore employ the same number of metal hanger members 16 as in the construction using the metal hanger members 16 in the centrally located position shown in Figure 4. The hanger tile 21 is provided with the short and long grooves 23 and 22 respectively, as in some constructions it is more convenient to support the tile 21 from the edge portions thereof rather than from the central portion of the longer groove 22.

It will also be noted that the recessing and grooving of the main refractory member 26, insofar as the grooves 28 and the flanges 30 and 31 are concerned (Figures 9 to 12 inclusive), is of a rather simple nature so that the cost of the main refractory members 26 is not increased by reason of this construction. The flange 30 has its side wall parallel and in the same plane as one of the sides of the tile 26, but the flange 31 has its side wall parallel but positioned inwardly of the side wall of the tile 26. This arrangement of the flanges 30, 31 in conjunction with the grooves 28 enables the same construction of main refractory tile 26 to be used for adjacent rows of the tile 26 staggered with respect to each other, for improving the heat sealing construction of the furnace wall.

Figures 13 to 15 inclusive show details of the clip member 11 with the circular lugs or projections 12, two of which are provided on each clip member in the embodiment shown in these figures. The clip member also has a pair of underlying flanges 13 adapted to engage the upper flange of the cross beam 14. When the lugs or projections 12 are fitted in position in the cooperating holes in the cross beams 14, the front portion 34 of the clip 11 will be seated on the lower flange of the I beam 10, rendering the clips 11 self-locking in their operative positions.

Figures 16 to 18 inclusive show details of the metal hanger member 16. The stepped construction of one of the flanges 17 enables the hanger member to be tilted and fitted over the lower flange of the cross beam 14 so that it need not be inserted from the end of the beam, and at the same time the provision of the shoulder 20 enables the hanger member 16 to be securely and snugly seated upon the lower flange of the cross beam 14 when the hanger member 16 is in its normal vertical supporting position. The wall 19 which connects the two side walls of the hanger member 16, in the embodiment shown in Figures 16 to 18 inclusive, is only about one-half the width of the side walls of the metal hanger 16. It is to be understood of course that this wall 19 could be as wide as the entire width of the side walls, the necessity for this depending upon the strength required in the hanger member for the purpose of supporting the furnace wall therefrom.

As indicated above, the dimensions of the hanger tile 21 are such that the tile is relatively narrow and small. This is important for the reason that when the insulation 29 is applied to the upper surface of the main tile members 26, such insulation covers practically the entire upper surface of the main tile members 26 except for the space occupied by the relatively narrow hanger tile members 21. Accordingly, the insulation applied to the construction of the furnace arch of the present invention is much more effective in preventing heat losses, than in prior constructions in which relatively large blocks have been employed without the use of any insulation, or so arranged that insulation, if employed, would be relatively ineffective. Moreover the present construction enables the thickness of the insulation 29 to be varied to a considerable extent before the insulation approaches the lower flanges 18 of the metal hanger members 16. Accordingly, all of the metal supporting structure can be well insulated from the high temperatures within the furnace, and the thickness of the insulation can be accurately determined, depending upon the temperatures at which the furnace is to be operated.

Attention is also directed to the fact that the use of hanger tile members 21 of the present invention greatly increases the normal life of the furnace. Thus, even if the lower portion of the main tile members 26 is burned away during the operation of the furnace, the tile hanger members 21 are equally able to withstand the high temperatures within the furnace, and accordingly the furnace is able to continue in operation for some time thereafter. In prior constructions in which metal hanger members were employed for the purpose of supporting the main tile members 26 directly therefrom, as soon as the main tile members 26 were in part burned away so that the higher temperatures would be directly effective in weakening the metal members, the furnace wall had to be repaired immediately. In the present construction all of the metal supporting structure is much farther removed from and remote to the high temperatures within the furnace and the tile hanger members 21 are able to withstand the same high temperatures as the main tile members 26. Thus, the tile hanger members are able to withstand temperatures of approximately 2200° F. to 2500° F. whereas it is considered relatively unsafe to expose the metal hanger structure to temperatures exceeding approximately 1500° F. It will therefore be appreciated that with the present construction the furnace can be operated at much higher temperatures than heretofore, or, if the furnace is operated at lower temperatures, the construction will deteriorate less rapidly than the prior constructions, and accordingly can remain in operation for much longer periods.

In connection with the repair of the furnace, it will be apparent that the tile hanger members 21 can be easily removed and replaced without disturbing any substantial portion of the furnace arch or any substantial portion of the metal supporting structure. In many prior constructions where it becomes necessary to replace hanger members, a considerable portion of the metal supporting structure must be removed to permit such replacement. In the present case either tile members 21 and/or tile members 26 can be simply, quickly and easily replaced with minimum of labor and expense and without disturbing any substantial portion of the metal supporting structure.

We have therefore provided an improved furnace arch or roof construction which eliminates considerable metal, replaces such metal with relatively inexpensive tile hanger members, and provides a furnace arch construction which is capable of operating under more intense heat conditions for longer periods of time, while at the same time greatly simplifying replacement and repair as and when this may become necessary.

It will, of course, be evident to those skilled in this art that the hanger refractories or tile of the present invention can also be used in the same manner, as retainer refractories or tile, for retaining the side walls of a furnace in alignment.

It will be apparent that various changes may be made in the form, construction and arrangement of the parts of this invention without departing from the scope of the invention as herein described and without sacrificing many of its important advantages, the form of the invention hereinbefore described being merely a preferred embodiment thereof.

We claim:

1. A furnace roof comprising a metal supporting structure including a series of beams and a number of metal hanger members each provided with a pair of opposed flanges directed toward each other with their adjacent edges resting on a flange of one of said beams, each metal hanger member being provided with a further pair of oppositely directed flanges extending in the same direction as said first pair, refractory hanger members supported from said metal supporting structure, each of said refractory hanger members being provided with oppositely disposed grooves in which said further pair of flanges of said metal hanger members are engaged for suspending the refractory hanger members from said metal hanger members, and a plurality of interengaging refractories supported by said refractory hanger members.

2. A furnace arch comprising a metal supporting structure including a series of beams and a number of metal hanger members, said metal hanger members being suspended from said series of beams, each of said metal hanger members having a pair of opposed flanges directed toward each other, refractory hanger members supported from said metal supporting structure, each of said refractory hanger members having two oppositely disposed grooves in the vertical sides thereof extending from one end of and terminating short of the other end of the refractory hanger member beyond the center line thereof to provide inner end walls for said grooves, said flanges of said metal hanger member being received in said grooves with the edge portions of said flanges positioned to contact said inner end walls of said grooves, the refractory hanger members being centrally suspended from said metal hanger members, and a plurality of interengaging refractories supported by said refractory hanger members.

3. A furnace arch comprising a metal supporting structure including a series of beams and a number of metal hanger members, each of said metal hanger members having a pair of opposed flanges directed toward each other and in seating engagement with a flange of said series of beams, at least one of said flanges of each of the metal hanger members having its lower face of stepped construction providing two downwardly facing surfaces at different levels, the higher level surface being nearest the free edge of the flange to facilitate mounting of the metal hanger member on the flange of the beam and to secure proper seating engagement therebetween, refractory hanger members adapted to be supported from said metal hanger members, and a plurality of interengaging refractories supported by said refractory hanger members.

4. A furnace arch comprising a metal supporting structure including a series of main I beams, and a series of cross beams having groups of holes in their top surfaces at longitudinally spaced intervals of such distance as to bring the groups of holes in proximity to the main I beams, pairs of clip members for supporting said cross beams from said main I beams, each clip having projections extending downwardly into the holes in the cross beams for locking the clip in operative position, each clip member having a projection extending in a horizontal direction toward the other clip of a pair and spaced therefrom for seating engagement on a flange of the main I beam, and each clip having a pair of flanges extending downwardly and toward each other on opposite sides of the cross beam with their free edges beneath the top flange of the cross beam, refractory hanger members, means connecting the hanger members to the cross beams, and a plurality of interengaging refractories supported by said refractory hanger member.

5. A furnace arch comprising a metal supporting structure, refractory hanger members adapted to be supported from said metal supporting structure, each of said refractory hanger members having opposed vertical side faces and substantially vertical end faces connecting said side faces and being provided with a pair of aligned spaced recesses in each side face thereof extending through said end faces adjacent the lower portion of the refractory hanger member, and a plurality of interengaging refractories supported by each of said refractory hanger members, each of said interengaging refractories having an undercut portion at its top edge seated in one of said recesses, said hanger members being narrow relative to said refractories.

6. A furnace arch comprising a metal supporting structure, refractory hanger members suspended from said metal supporting structure, each of said refractory hanger members having opposed vertical side faces and substantially vertical end faces connecting said side faces and being provided with a plurality of aligned spaced recesses in said side faces extending through said end faces, all of said recesses being of equal size, and a plurality of interengaging refractories supported by said refractory hanger members, each of said interengaging refractories having flanges at the top edges thereof of a size and shape to fill a recess, one of the flanges of each refractory being supported in one of said recesses, said hanger members being narrow relative to said refractories.

7. A furnace arch comprising a metal supporting structure including a series of beams and a number of metal hanger members each provided with a pair of side walls connected by a wall intermediate the ends of said side walls, the upper ends of said side walls having inturned flanges thereon seated on a flange of said beams, the lower ends of said side walls also having inturned flanges thereon, refractory hanger members adapted to be supported from said metal supporting structure, each of said refractory hanger members being provided with grooves in which are received said inturned flanges on the lower ends of the side walls of said metal hanger members for suspending the refractory hanger members from said metal hanger members, and a plurality of interengaging refractories supported by said refractory hanger members.

8. A furnace arch comprising a metal supporting structure including a series of main I beams, and a series of cross beams, pairs of clip members for supporting said cross beams from said main I beams, each clip member having lugs extending from the underside adjacent one end thereof, the cross beams having holes therein in which said lugs are located for locking the clip member in operative position, each clip member having a yoke extending from the central portion thereof, the outer ends of said yoke terminating in inturned flanges supporting therebetween the top flange of the cross beam, each clip member also having a surface for seating engagement with a flange of the main I beam, refractory hanger members supported from said metal supporting structure, and a plurality of interengaging refractories supported by said refractory hanger member.

9. A furnace roof comprising a metal supporting structure including a series of main I beams and a series of cross beams, pairs of clip members supporting the cross beams from the main beams, the cross beams having holes in the top thereof on opposite sides of the main beams and said clip members having projections extending into said holes to prevent endwise movement of the clip members on the cross beams, metal hanger members supported on the cross beams, refractory hanger members carried on the metal hanger members, and a plurality of refractories carried by each refractory hanger member.

10. A furnace arch comprising a metal supporting structure, refractory hanger members of the same rectangular horizontal cross section at their lower extremities and adjacent the middle level vertically, means supporting said hanger members from said metal supporting structure, said refractory hanger members being provided with recesses in their side faces below said middle level at the corners thereof and a plurality of interengaging refractories supported by each of said refractory hanger members, said refractory hanger members being narrow and small relative to said refractories, each of said refractories having flanges at their top ends extending horizontally into said recesses, whereby four of said refractories arranged in two adjacent rows are supported from a single refractory hanger member.

11. A furnace arch comprising a metal supporting structure, refractory hanger members suspended from said metallic supporting structure, said hanger members each having parallel side faces defining the maximum thickness thereof and having a plurality of recesses in said side faces, a plurality of refractories supported by said hanger members having formations interengaging with said recesses to suspend said refractories from said hanger members, said recesses being shorter than said side faces to provide portions of the maximum thickness of said hanger members in horizontal alignment with the recessed portions, and a layer of heat insulating material between the upper surface of said refractories and said metal supporting structure, said hanger members each having a portion of maximum thickness extending from the refractory supporting portion thereof to above the point of suspension of said hanger member.

12. A furnace arch comprising a metal supporting structure, refractory hanger members suspended from said metallic supporting structure, said hangar members each having parallel side faces defining the maximum thickness thereof and having a plurality of recesses in said side faces, said refractory hanger members having grooves in the upper portions thereof and said metallic supporting structure having means received in said grooves to suspend said refractory hanger members therefrom, a plurality of refractories supported by said hanger members having formations interengaging with said recesses to suspend said refractories from said hanger members, said recesses being shorter than said side faces to provide portions of the maximum thickness of said hanger members in horizontal alignment with the recessed portions, and a layer of heat insulating material between the upper surface of said refractories and said metal supporting structure, said hanger members each having a portion of maximum thickness extending from the refractory supporting portion thereof to above the point of suspension of said hanger member.

13. A furnace arch comprising a metal supporting structure, tall narrow refractory hanger members suspended from said metallic supporting structure, said hanger members each having flat top and bottom faces and parallel plane side faces extending from top to bottom thereof to define a body portion having a zone of uniform thickness extending from top to bottom thereof, a plurality of refractories suspended from each of said hanger members, the thickness of the refractories suspended from each hanger member being much greater than that of said body portions, said hanger members extending between said refractories and said refractories and hanger members having interengaging formations thereon comprising lateral projections on the ones thereof entering recesses in the sides of the others thereof, said formations occupying only a portion of the length of each of said side faces, whereby said zone of uniform thickness extends from below the point of suspension of said refractories between the same to above the point of suspension of said hangers, and a layer of heat insulating material between the upper surface of said refractories and said metal supporting structure, said hanger members having the major portion of their height projecting above the tops of said refractories and having their points of suspension from said supporting structure and the points of suspension of said refractories therefrom widely spaced from each other vertically to space said refractories widely from said metallic structure and provide space for a deep layer of said heat insulating material between the top surface of said refractories and the bottom of said metallic structure, over the major portion of the top surface of said refractories.

14. In a furnace, a metal supporting structure, a plurality of refractory blocks, means for mounting said refractory blocks on said supporting structure to collectively form a wall, comprising elongated refractory members connecting said blocks with said metallic supporting structure, said connecting members each having parallel plane side faces defining the maximum thickness thereof and plane end faces, said side faces each having a pair of recesses therein shorter and narrower than said side faces aligned with each other longitudinally of said connecting member, extending through said end faces and spaced apart longitudinally of said connecting member at their adjacent ends to provide a portion of said maximum thickness lying between said adjacent ends, said connecting member having a portion of said maximum thickness extending longitudinally of said connecting member between said end faces on the side of said aligned recesses remote from said supporting structure, and a portion of said maximum thickness extending longitudinally of said connecting member between said end faces on the side of said recesses nearest said supporting structure, the portion of said maximum thickness lying between the adjacent ends of said recesses connecting said longitudinally extending portions of maximum thickness lying on the opposite sides of said recesses, said blocks having formations thereon interengaging with said recesses to secure said refractory blocks to said connecting members, and a layer of heat insulating material between the surface of said refractory blocks nearest said metal supporting structure and said supporting structure, said connecting members each having a portion of of said maximum thickness extending from the portion thereof to which said refractory blocks are secured to beyond their point of connection with said metallic supporting structure.

LOUIS H. HOSBEIN.
LOUIS ELLMAN.

REFERENCES CITED

The following references are of record in the file of this patent:

UNITED STATES PATENTS

| Number | Name | Date |
|---|---|---|
| 1,173,862 | Reilly | Feb. 29, 1916 |
| 1,326,753 | Liptak | Dec. 30, 1919 |
| 1,454,292 | Liptak | May 8, 1923 |
| 1,457,442 | Liptak | June 5, 1923 |
| 1,623,632 | McCraig | Apr. 5, 1927 |
| 1,642,254 | Liptak | Sept. 13, 1927 |
| 1,718,671 | Walsh | June 25, 1929 |
| 1,723,650 | Himmelright | Aug. 6, 1929 |
| 1,751,676 | Abbott | Mar. 15, 1930 |
| 1,848,737 | Matthews | Mar. 8, 1932 |
| 2,140,185 | Hosbein | Dec. 13, 1938 |

FOREIGN PATENTS

| Number | Country | Date |
|---|---|---|
| 477,131 | Great Britain | Dec. 22, 1937 |
| 489,696 | Great Britain | July 28, 1938 |